(12) United States Patent
Perdices-Gonzalez et al.

(10) Patent No.: US 11,159,840 B2
(45) Date of Patent: Oct. 26, 2021

(54) USER-AWARE REMOTE CONTROL FOR SHARED DEVICES

(71) Applicant: Samsung Electronics Co., Ltd., Suwon-si (KR)

(72) Inventors: Sergio Perdices-Gonzalez, Sunnyvale, CA (US); Marc Estruch Tena, San Jose, CA (US); Jun Yeon Cho, San Jose, CA (US); Santiago Ortega Avila, Sunnyvale, CA (US); Jack Thrun, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 16/243,717

(22) Filed: Jan. 9, 2019

(65) Prior Publication Data

US 2020/0037018 A1   Jan. 30, 2020

Related U.S. Application Data

(60) Provisional application No. 62/703,099, filed on Jul. 25, 2018.

(51) Int. Cl.
*H04N 21/41* (2011.01)
*H04L 29/08* (2006.01)
*G06K 9/00* (2006.01)

(52) U.S. Cl.
CPC ..... *H04N 21/4126* (2013.01); *G06K 9/00892* (2013.01); *H04L 67/125* (2013.01); *H04L 67/306* (2013.01)

(58) Field of Classification Search
None
See application file for complete search history.

(56) References Cited

U.S. PATENT DOCUMENTS

| 2001/0030644 A1 | 10/2001 | Allport |
| 2006/0075255 A1* | 4/2006 | Duffy ................ G06K 9/00885 |
| | | 713/186 |

(Continued)

FOREIGN PATENT DOCUMENTS

| JP | 2018-050269 A | 3/2018 |
| KR | 1020100125484 A | 12/2010 |

(Continued)

OTHER PUBLICATIONS

Notification of Transmittal of the International Search Report and the Written Opinion of the International Searching Authority, or the Declaration dated Sep. 24, 2019 in connection with International Patent Application No. PCT/KR2019/007127, 10 pages.

(Continued)

*Primary Examiner* — Samira Monshi

(57) ABSTRACT

An apparatus and method for a user-aware remote control for a shared device, such as a computing device, is provided herein. The computing device includes a transceiver and a processor. The transceiver is configured to communicate with a remote control. The processor is configured to: receive, from the remote control, identification data for a user of the computing device, the identification data for the user being generated at the remote control based on biometric information associated with the user received at the remote control; identify, based on the identification data, at least one application associated with the user; retrieve, based on the identification data, personalized application information associated with the user and applicable to the at least one application; and apply the personalized application information to the at least one application.

20 Claims, 13 Drawing Sheets

(56) References Cited

U.S. PATENT DOCUMENTS

| | | | | |
|---|---|---|---|---|
| 2009/0138805 A1* | 5/2009 | Hildreth | ........... | H04N 21/64322 |
| | | | | 715/745 |
| 2009/0251619 A1* | 10/2009 | Seidel | .................. | H04N 5/4403 |
| | | | | 348/734 |
| 2011/0113441 A1* | 5/2011 | Jeong | ................. | H04N 7/17363 |
| | | | | 725/25 |
| 2012/0257797 A1* | 10/2012 | Leyvand | ............ | G06K 9/00221 |
| | | | | 382/118 |
| 2012/0316876 A1 | 12/2012 | Jang et al. | | |
| 2014/0053189 A1 | 2/2014 | Lee et al. | | |
| 2015/0205622 A1* | 7/2015 | DiVincent | ............... | G06F 21/32 |
| | | | | 713/100 |
| 2016/0225133 A1* | 8/2016 | Yang | ..................... | A63F 13/426 |
| 2016/0292404 A1 | 10/2016 | Tseng et al. | | |

FOREIGN PATENT DOCUMENTS

| | | |
|---|---|---|
| KR | 101044747 B1 | 6/2011 |
| KR | 1020150049243 A | 5/2015 |
| KR | 101548195 B1 | 9/2015 |
| KR | 1020180061826 A | 6/2018 |
| KR | 1020180089944 A | 8/2018 |

OTHER PUBLICATIONS

Office Action dated Dec. 22, 2020 in connection with India Patent Application No. 201924028722, 6 pages.

\* cited by examiner

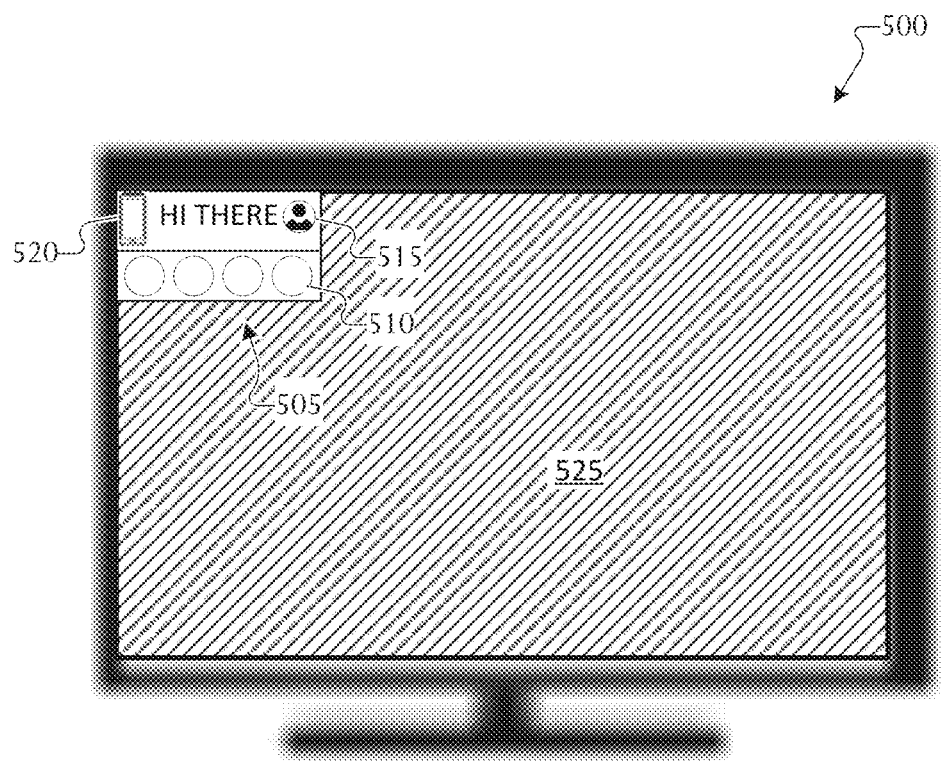
FIGURE 5
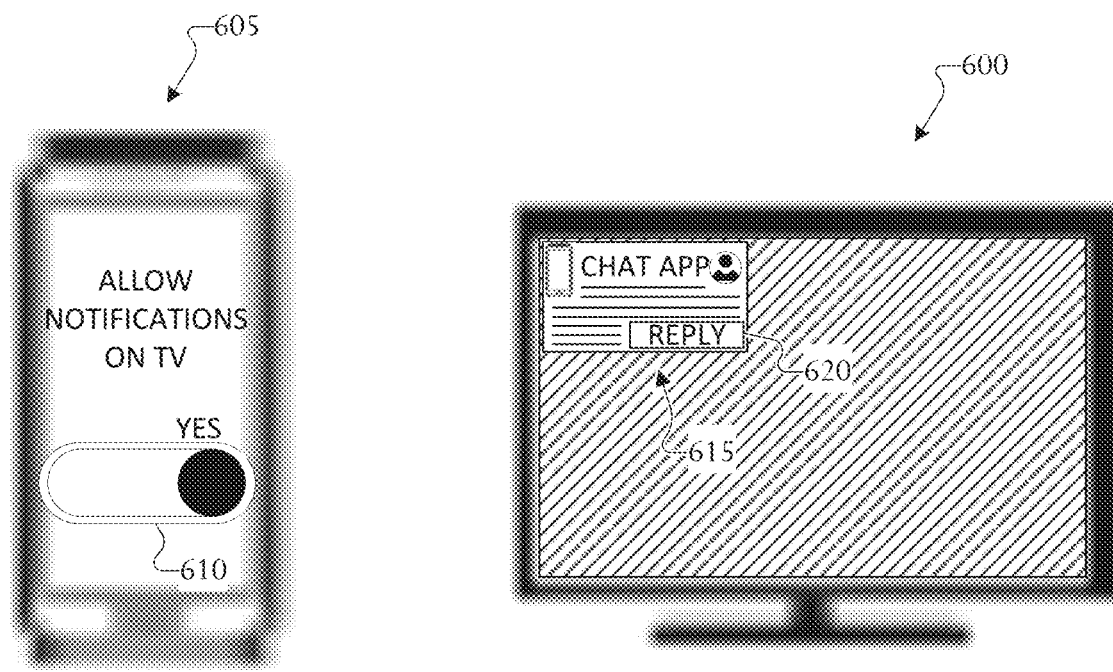
FIGURE 6A
FIGURE 6B

USER-AWARE REMOTE CONTROL FOR SHARED DEVICES

CROSS-REFERENCE TO RELATED APPLICATION(S) AND CLAIM OF PRIORITY

This application claims priority under 35 U.S.C. § 119(e) to U.S. Provisional Patent Application No. 62/703,099 filed on Jul. 25, 2018 and entitled "USER-AWARE REMOTE CONTROL FOR SHARED DEVICES". The above-identified provisional patent application is hereby incorporated by reference in its entirety.

TECHNICAL FIELD

This disclosure relates generally to remote control. More specifically, this disclosure relates to a user-aware remote control for shared devices.

BACKGROUND

A remote control (i.e., a remote) is a component of an electronic device used to operate the device from a distance, usually wirelessly. Remote controls can be used to operate devices such as a television set, DVD player, or other home appliance, from a short distance. A remote control is primarily a convenience feature for the user, and can allow operation of devices that are out of convenient reach for direct operation of controls.

Early television remote controls (1956-1977) used ultrasonic tones. Present-day remote controls are commonly consumer infrared devices, which send digitally-coded pulses of infrared radiation to control functions such as power, volume, channels, playback, track change, heat, fan speed, or other features varying from device to device. Remote controls for these devices are usually small wireless handheld objects with an array of buttons for adjusting various settings such as television channel, track number, and volume. For many devices, the remote control contains all the function controls while the controlled device itself has only a handful of essential primary controls. The remote control code, and thus the required remote control device, is usually specific to a product line, but there are universal remotes, which emulate the remote control made for most major brand devices.

Remote control has continually evolved and advanced in the 2000's to include Bluetooth connectivity, motion sensor-enabled capabilities and voice control.

SUMMARY

This disclosure provides a system and method for a user-aware remote control for shared devices.

In a first embodiment, a computer-implemented method is provided. The method includes receiving, by a computing device operable with a remote control, identification data for a user of the computing device, the identification data for the user being generated at the remote control based on biometric information associated with the user received at the remote control; identifying, by the computing device, based on the identification data, at least one application associated with the user and operable at the computing device; retrieving, by the computing device, based on the identification data, personalized application information associated with the user and applicable to the at least one application; and applying, by the computing device, the personalized application information to the at least one application operable at the computing device.

In a second embodiment, a computing device is provided. The computing device includes a transceiver and a processor. The transceiver communicates with a remote control. The processor receives, from the remote control, identification data for a user of the computing device, the identification data for the user being generated at the remote control based on biometric information associated with the user received at the remote control; identifies, based on the identification data, at least one application associated with the user; retrieves, based on the identification data, personalized application information associated with the user and applicable to the at least one application; and applies the personalized application information to the at least one application.

In a third embodiment, a non-transitory computer readable medium is provided. The non-transitory computer readable medium includes a plurality of instructions that, when executed by a processor, are configured to cause the processor to receive identification data for a user of the computing device, the identification data for the user being generated at the remote control based on biometric information associated with the user received at the remote control; identify, based on the identification data, at least one application associated with the user and operable at the computing device; retrieve, based on the identification data, personalized application information associated with the user and applicable to the at least one application; and apply, the personalized application information to the at least one application operable at the computing device.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™ APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 5 illustrates an exemplary options interface with an option menu for presenting information or controlling functions on a phone according to embodiments of the present disclosure;

FIGS. 6A and 6B illustrate an exemplary notification interface for controlling of notifications using the user-aware remote control according to embodiments of the present disclosure;

DETAILED DESCRIPTION

FIGS. 1 through 15, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

Televisions have added smart features such as apps in recent years. The current issue of the Smart TVs as well as with most of home devices is sharing among different users. A home system or Smart TV does not previously have knowledge of the user is, leading to non-personalized or a mix of different profile settings. Media consuming apps are based in a recommendation system that suggests and tracks the media that a user consumes or likes.

The present disclosure provides for a controller for shared devices. Shared device refers to individual devices that are shared amongst a number of different users. The user-aware remote control provides for a secure setup for new users or new devices. The user-aware remote control provides for secure authentication for users that are previously registered with a shared device. Understanding individual user behavior and preferences by the user-aware remote control allows for customized interfaces more compatible with a user. Identifying a specific user can provide personalized settings on shared devices or interfaces. Detecting a user by an identifying features allows for seamless setup and login credentials for an interface. The identification of the user can be implemented in advancing connectivity between personal devices. The server can use the identification of a specific user to target recommendations or advertisements.

Figure 1:
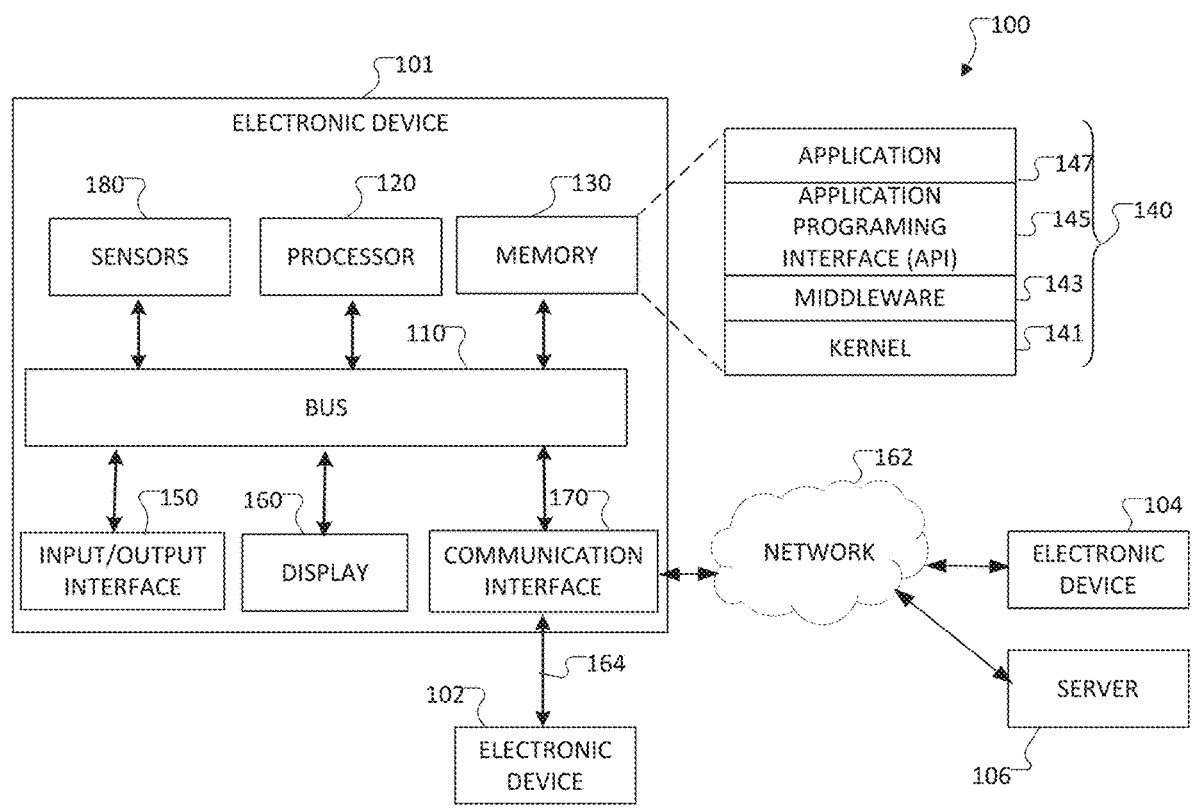
FIG. 1 illustrates an example of a network configuration according to an embodiment of this disclosure.

FIG. 1 illustrates an example network environment 100 according to various embodiments of the present disclosure. The embodiment of the network environment 100 shown in FIG. 1 is for illustration only. Other embodiments of the network environment 100 could be used without departing from the scope of this disclosure.

According to an embodiment of the present disclosure, an electronic device 101 is included in a network environment 100. The electronic device 101 can include at least one of a bus 110, a processor 120, a memory 130, an input/output (IO) interface 150, a display 160, a communication interface 170, or sensors 180. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive, from the remote control, identification data for a user of the computing device, the identification data for the user being generated at the remote control based on biometric information associated with the user received at the remote control. The processor 120 can identify, based on the identification data, at least one application associated with the user. The processor 120 can retrieve, based on the identification data, personalized application information associated with the user and applicable to the at least one application. The processor 120 can apply the personalized application information to the at least one application.

The memory 130 can include a volatile and/or non-volatile memory. For example, the memory 130 can store commands or data related to at least one other component of the electronic device 101. In various embodiments, the memory 130 can store biometric information and personalized application information depending on the electronic device that the memory 130 is included with. According to an embodiment of the present disclosure, the memory 130 stores software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second external electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as biometric information, temporary passwords or codes, hashes, etc.

Electronic device 101 further includes one or more sensors 180 that can meter a physical quantity or detect an activation state of the electronic device 101 and convert metered or detected information into an electrical signal. For example, sensor 180 can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 can be located within the electronic device 101. A biometric sensor 180 can capture a biometric marker of a user for identifying an account corresponding to the user.

The first external electronic device 102 or the second external electronic device 104 can be a wearable device or an electronic device 101—mountable wearable device (e.g., an optical head mounted display (HMD)). When the electronic device 101 is mounted in a HMD (e.g., the electronic device 102), the electronic device 101 is able to detect the mounting in the HMD and operate in an augmented reality mode. In certain embodiments, the electronic device 101 is able to detect the mounting in the HMD and operate in an augmented reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks. Examples of communication include a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Figure 2:
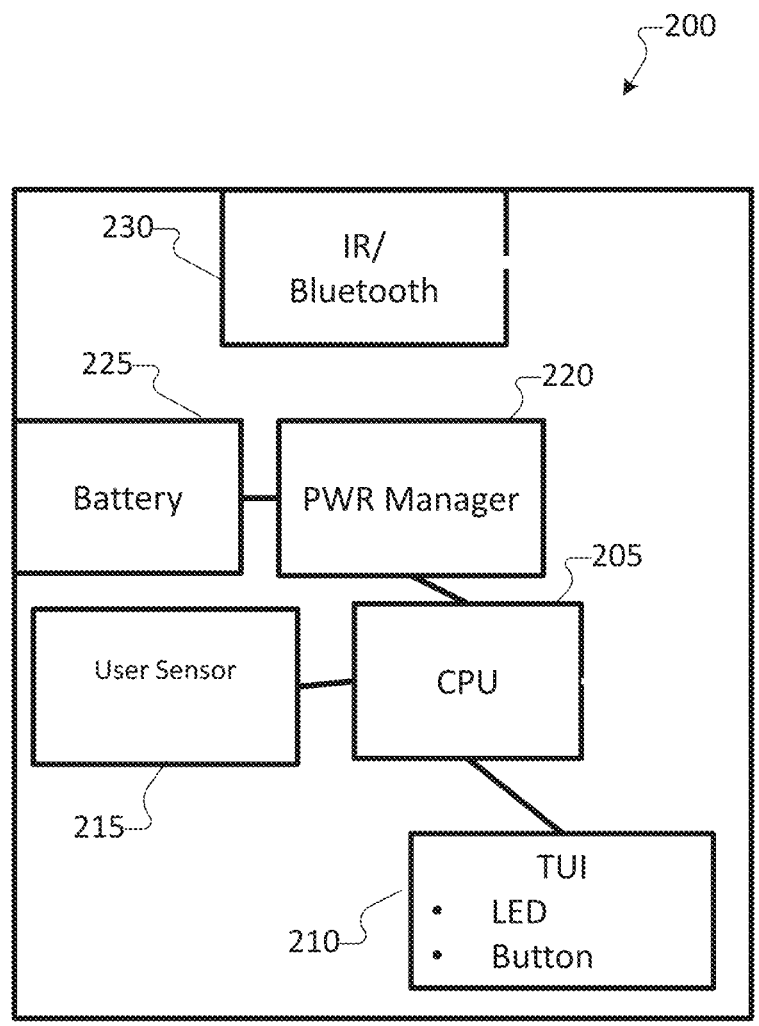
FIG. 2 is a block diagram of an example configuration of a user-aware remote control according to an embodiment of this disclosure.

FIG. 2 is a block diagram of an example configuration of a user-aware remote control 200 according to an embodiment of this disclosure. The embodiment of the user-aware remote control 200 shown in FIG. 2 is for illustration only. Other embodiments of user-aware remote control could be used without departing from the scope of this disclosure. The electronic device 200 depicted in FIG. 2 can be configured the same as, or similar to, any of electronic devices 101, 102, or 104.

The user-aware remote control 200 is used to control a specific interface or compatible interfaces. The user-aware remote 200 includes a central processing unit (CPU) 205, a tactile user interface (TUI) 210, a user sensor 215, a power manager 220, a battery 225, and a wireless transceiver 230. The user-aware remote control 200 can register a plurality of users and can distinguish between each of the plurality of users that interacts with the remote. The user-aware remote control 200 provides for secure authentication, awareness of user behavior and preferences, personal content, user-specific privacy settings, seamless setup and login credentials, connectivity between personal devices, targeted recommendations and advertisements, etc.

The CPU 205 is coupled to the TUI 210, the user sensor 215, power manager 220, battery 225, and the wireless transceiver 230. The CPU 205 receives signals from each of the components and can control each of the components.

The TUI 210 is used as a display with the remote control 200. The TUI can be, for example, an LED, a button, etc. The TUI 210 can display an interface and converts an interaction from a user into an electrical signal input. The TUI 210 provides inputs that correspond to controls for the interface. The remote control 200 can provide personalized buttons on the TUI 210 after detecting a specific user. In other words, the TUI 210 can be customized based on detecting the user. Customization of the TUI can include specialized button distribution, specialized button size, restricted buttons for specific user (for example, children, etc.).

The user sensor 215 is a sensor for authenticating a specific user and distinguishing a specific user from amongst a plurality of registered users. The user sensor 215 can be, for example, a fingerprint sensor, iris scanner, face detection, voice recognition, etc. The user sensor 215 can be placed in the remote control 200 in a convenient location and symmetrical position for either right or left-handed users. The user sensor can use impedance sensing of different parts of a body. In certain embodiments, voice detection to identify a voice can be used to detect the user.

In certain embodiments, finger geometry recognition can be used to determine a user. The spatial biometric three-dimensional geometry of the finger can be used to determine the user. Simple detection of a user by conductively reading points can be placed around a controller to determine a geometry of a hand grabbing the remote control.

In certain embodiments, an optical sensor, iris scanner, etc. can be used to identify a face. The camera of a smartphone could be used to capture an image or preview of a face for analyzing. A retinal scan could be used to identify unique patterns on a person's retina blood vessels. An iris scan can look at one or more features found in the iris for identification.

In certain embodiments, a heart rate sensor could be used to identify the user. Each person is different and the system could be trained to detect a user in a small subgroup.

The identification could use multiple sensors in combination to determine a user. The sensors could be used based on accuracy and time to take the measurements. For example, a faster, but less accurate sensor could be initially used to reduce a pool of authorized users and a slower, but more accurate sensor could be used to identify the exact user in the reduced pool. Another reason for using multiple sensors would be for greater accuracy or security. Certain sensors may have a higher false positive rate and using a combination would reduce unauthorized access or miss identified users.

The power manager 220 manages the power usage of the user-aware remote control 200. The power manager 220 controls consumption of the battery by different components.

The battery 225 powers the different components of the user-aware remote control 200. The battery can be rechargeable or replaceable.

The wireless transceiver 230 is used to transmit or receive signals from an interface. The term interface can be used interchangeably with televisions, monitor, etc.

In certain embodiments, a smartphone can be used as a remote, such as through an application or setting on the phone. The smartphone can become the remote when authorized by the remote control, or the smart phone and remote control can be combined.

Figure 3A:
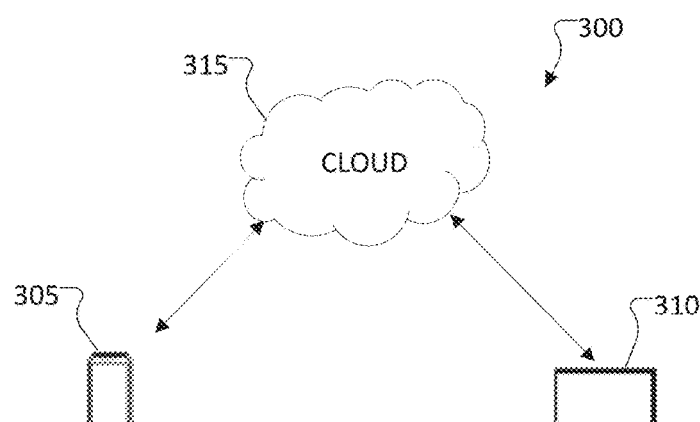
FIGS. 3A and 3B are an exemplary system and process for seamless setup up of a user-aware remote control according to embodiments of the present disclosure.
Figure 3B:
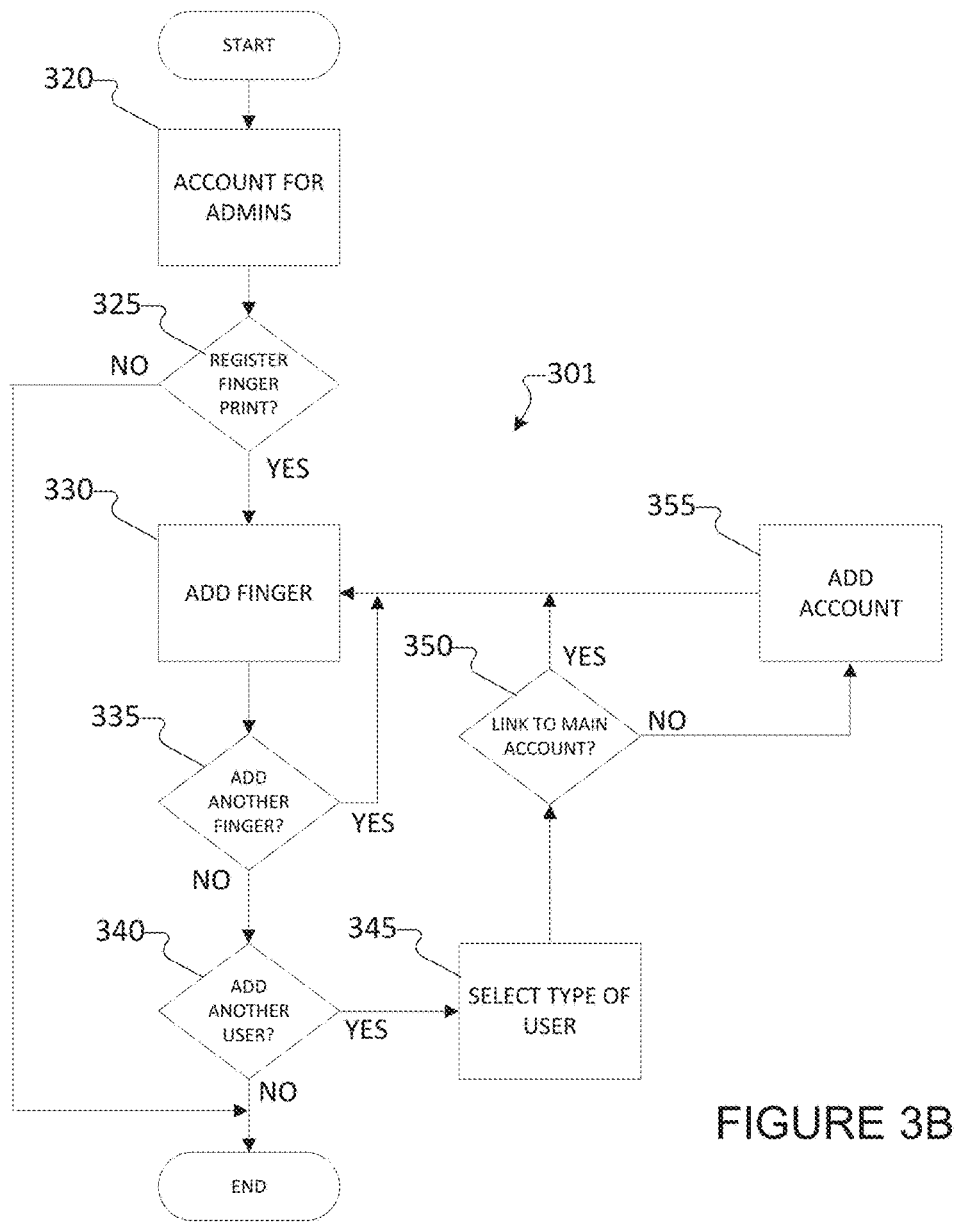
Figure 4A:
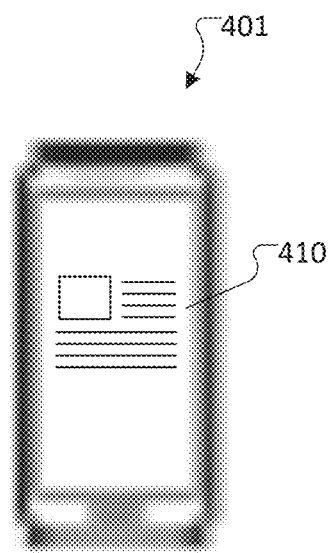
FIGS. 4A, 4B, 4C, and 4D illustrate examples of content interfaces providing content last being consumed on a phone at connection according to an embodiment of this disclosure.
Figure 4B:
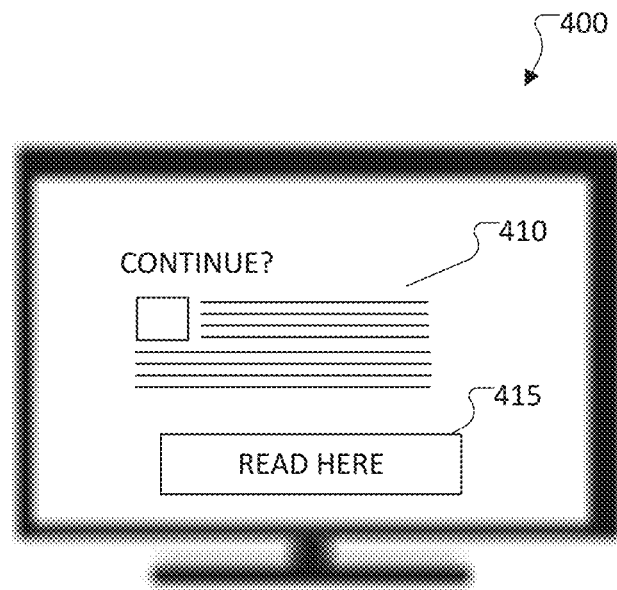
Figure 4C:
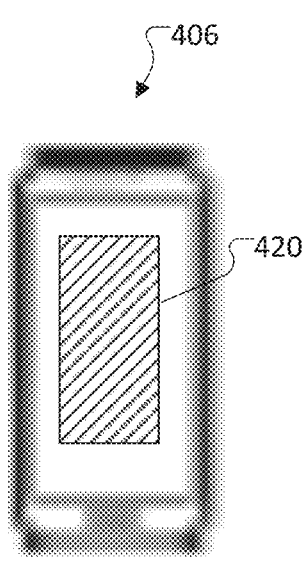
Figure 4D:
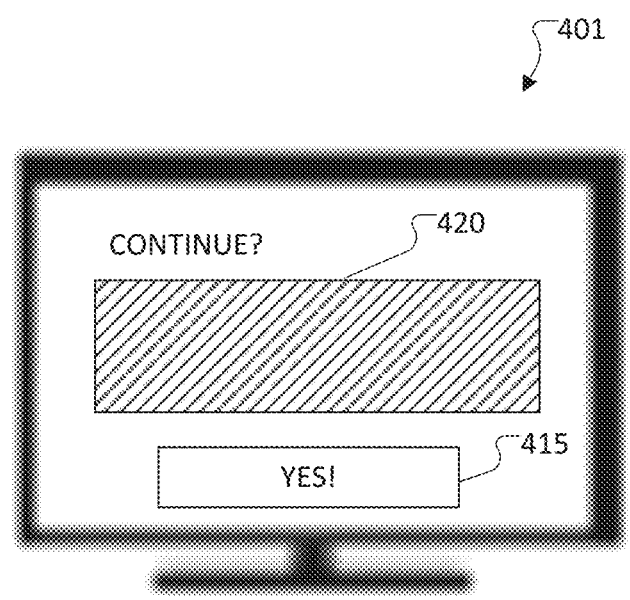

FIGS. 3A and 3B are an exemplary system 300 and process 301 for seamless setup up of a user-aware remote control according to embodiments of the present disclosure. The embodiment of the system 300 shown in FIG. 3A is for illustration only. Other embodiments of system could be used without departing from the scope of this disclosure. While the flow chart in FIG. 3B depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a user-aware remote control or user-aware interface.

The system 300 provides for seamless setup of a user-aware remote control. The system 300 includes a user-aware remote control 305, a cloud 315 (e.g., one or more servers), and an interface 310.

The user-aware remote control 305 can identify a user and can determine specific functions based on the user. The user-aware remote control 305 can control the history profile, manage access of devices, provide two-factor authentication for new interfaces, etc.

The cloud 315 interacts with the remote control 305 and the interface 310. The cloud 315 can store a registry of the register users as well as programming for determining specific functions for the interface. The cloud 315 can store or provide the authentication system, viewing profiles, listed profiles, and TV preferences.

The interface 310 can receive the inputs from the remote control 305 and transmit information back to the remote control 305. The interface 310 can provide quick authentication to only the interface to a phone, quickly setup device from saved preferences, etc.

In operation 320, the user-aware remote 305 can access an account for an administrator. The account for an administrator can identify registered users stored in the cloud 315. The cloud 315 can store an identifying feature for each user based on the user sensor on the user-aware remote control 305. For example, a user-aware remote control 305 with a fingerprint scanner will store one or more fingerprints of the user in the cloud 315. Other examples of identifying features can include, for example, iris scans, voice scans, verbal passwords, etc. For convenience of discussion, the identifying feature is referred to and interchangeable with a fingerprint.

In operation 325, the electronic device 100 determines whether a fingerprint is to be registered. The fingerprint can be scanned and used to identify a user. When the fingerprint is not in the register of a user logged in to the admin account, the process can proceed to operation 330. When the fingerprint is already registered or unreadable, the process can proceed to the end. This operation can be in response to a user selection of adding a fingerprint to the account.

In operation 330, the electronic device 101 adds the fingerprint to the registry. The fingerprint can be stored on the user-aware remote 305, the interface 310, or the cloud 315. The fingerprint can be encrypted or otherwise altered in a manner that the system can still use it to identify later uses of the user-aware remote 305, but provides privacy and protects the underlying information from other users.

In operation 335, the electronic device 101 determines whether another to add another fingerprint. The electronic device 101 can detect another unregistered finger or receive an input from a user that another finger is to be registered. When determining that another finger needs registering, the process returns to operation 330. When another finger is not to be registered, the process proceeds to operation 340.

In operation 340, the electronic device 101 determines whether another user is to be added. Because the user-aware remote differentiates between users, the system can retain a plurality of users and a plurality of fingers for each user in an account or separate accounts. An account can be related to a specific user-aware remote control, a specific user or a specific interface. When another user is to be added to a specific user-aware remote control or a specific interface, the process can proceed to operation 345. When another user is not needed to be added, the process ends.

In operation 345, the electronic device 101 selects a user type. The user type can correspond to a predetermined setting or a setting received from the inputs of the user-aware remote control.

In operation 350, the electronic device 101 determines whether the user is linked to the main account. Depending on the type of account, the new user can have different restrictions or user preferences based on the user type and relation to the admin of the account. When the new user is linked to the main account, the process can proceed to add a finger for the new user in operation 330. When the new user is not to be linked to the main account, the process can proceed to operation 355.

In operation 355, the electronic device 101 creates a new account for the new user. The new account can allow for customized privacy and other settings or restrictions. The new account can be added into a registry or storage with the device that the account is related to. For example, if the account is for the interface, the account information can be stored at the interface.

FIGS. 4A, 4B, 4C, and 4D illustrate examples of content interfaces 400 and 401 providing content last being consumed on phones 405 and 406 at connection according to an embodiment of this disclosure. The embodiment of the content interfaces 400, 401 and the phones 405, 406 shown in FIGS. 4A-4D are for illustration only. Other embodiments of phones and content interfaces could be used without departing from the scope of this disclosure.

The phones 405, 406 can be connected to the content interfaces 400, 401. At the time of connection, information, such as reading content 410 or video content 420, being consumed on the phones 405, 406 can be presented as a preview on the content interfaces 400, 401 with an acceptance icon 415. The acceptance icon 415 can be selected from either the phones 405, 406 or other interface control methods. Once the acceptance icon 415 is selected, the preview can be expanded to the entire interface. If another command is received, the content interfaces 400, 401 can close the preview and can either perform the new command or revert to the previous content.

FIG. 5 illustrates an exemplary options interface 500 with an option menu 505 for presenting information or controlling functions 510 on a phone 515 according to embodiments of the present disclosure. The embodiment of the option interface 500 shown in FIG. 5 is for illustration only. Other embodiments of option interfaces could be used without departing from the scope of this disclosure.

The options interface 500 includes an options menu 505 along with the displayed content. The options menu 505 provides functions 510 for controlling the connected phone using the options interface 500. The options menu 505 can include a plurality of information items or functions 510, a user icon 515, and a device icon 520.

The functions 510 can be used to control the phone or access applications that are installed on the phone. The functions 510 can allow for controlling the phone or the accessing the applications on the content area 525 of the options interface 500. Examples of functions can include "do not disturb," locate phone, etc. Examples of information items can include remaining battery life, cellular signal strength, etc.

The user icon 515 identifies the user that is determined by the user-aware remote control. Selecting the user icon 515 can provide further options, such as select a different user or log out as the user. The device icon 520 identifies the specific device that is currently linked to the interface. Selecting the device icon 520 can also provide further options for the linked device.

FIGS. 6A and 6B illustrate an exemplary notifications interface 600 for controlling notifications 615 using the user-aware remote control 605 according to embodiments of the present disclosure. The embodiment of the user-aware remote control 605 and notification interface 600 shown in FIGS. 6A and 6B are for illustration only. Other embodiments of notification interfaces and user-aware remote control could be used without departing from the scope of this disclosure.

The notifications interface 600 can display notifications 615 along with the displayed content. The remote (or phone) 605 can include a setting 610 for controlling notifications displayed on the notifications interface 600. The setting 610 can be, for example, a slide bar, switch, check box, etc. The remote 605 can include more than one setting 610 for different types of notifications to further customize the notifications that are displayed.

Figure 7A:
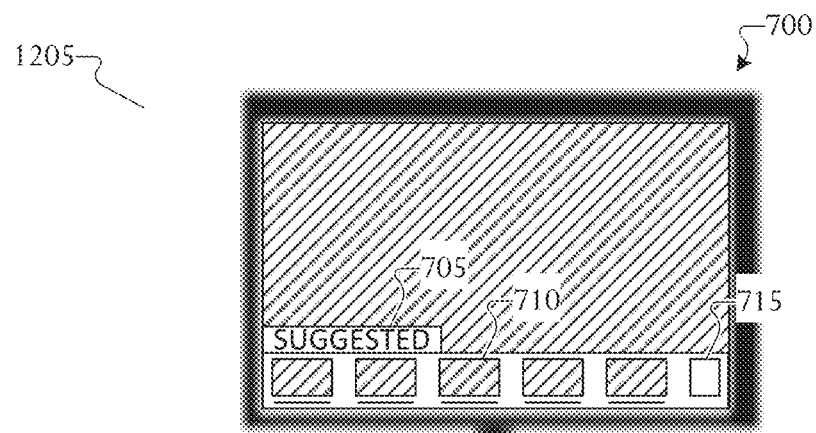
FIGS. 7A, 7B, and 7C illustrate exemplary suggestion interfaces for different user suggestions based on recognized users according to embodiments of the present disclosure.
Figure 7B:
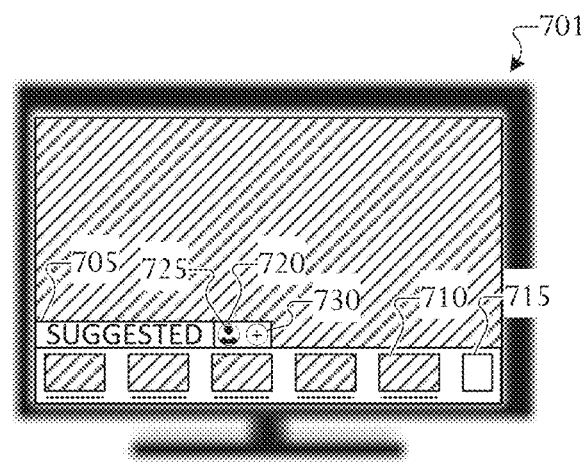
Figure 7C:
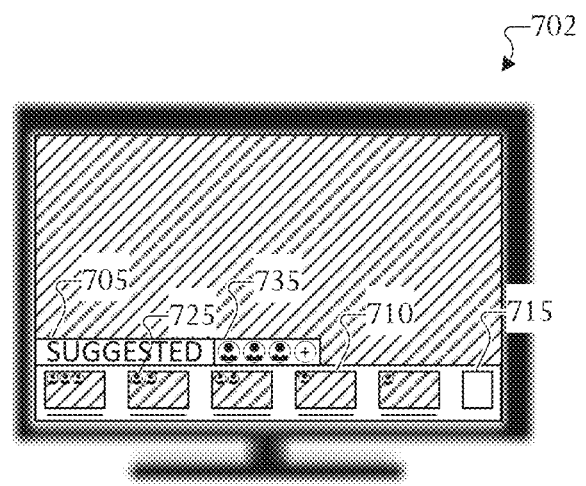

FIGS. 7A, 7B, and 7C illustrate exemplary suggestion interfaces 700, 701, 702 for different user suggestions 705 based on recognized users 720, 725 according to embodiments of the present disclosure. The embodiments of the suggestion interfaces 700, 701, 702 shown in FIGS. 7A-7C are for illustration only. Other embodiments of suggestion interfaces could be used without departing from the scope of this disclosure.

The suggestion interfaces 700, 701, 702 provide suggestions based on the detected user accounts or user profiles. Suggestion interface 700 shows an interface for no selected profiles, suggestion interface 701 shows an interface for a single profile, and suggestion interface 702 shows an interface for several profiles.

Suggestion interface 700 includes a suggestion list 705 displayed along with the current content. The suggestion list includes suggested content 710 and a "more" icon 715. The displayed suggested content 710 can include content that is available on a connected device, available for streaming, available over a subscriber network, etc. The ordering of the suggested content 710 for the suggestion interface 700 can be determined by factors such as general popularity of available content, previously viewed content, current content on previously viewed streams or channels, etc. The "more" icon 715 can provide extra suggested content or display a separate window with an extended suggested content list.

Suggestion interface 701 includes a suggestion list 705 and a user list 720. The user list 720 includes a user icon 725 and an add user icon 730. The user icon 725 indicates one or more active users either logged into the suggestion interface 701 or connected through a phone or user-aware remote control. The add user icon 730 allows for extra users to be added to the user list 720.

Suggestion interface 702 includes a multi-user suggestion list 735 with a plurality of user icons 725. When more than one user is logged into or connected with the suggestion interface 702, the user preferences are aggregated to improve the suggestion list based on the current users. The suggested content 710 includes user icons 725 that match the suggested content. Thus, the suggested content 710 can be further arranged based on the amount of users the content applies to.

As an example, two users, User 1 and User 2, are both logged into the suggestion interface 702. User 1 uses three contents 710, App A, App B, and App C. User 2 also uses three contents 710, App A, App C, and App D. The suggestion interface 702 would cause App A and App C to show respective information. That is, the suggestion content 710 corresponding to these mutual apps (App A and App C) would show the respective view progresses, respective preferences, and/or respective names, etc. for each of User 1 and User 2. The suggestion content 710 corresponding to App B would only show information associated with User 1. App D would only show information associated with User 2.

Figure 8:
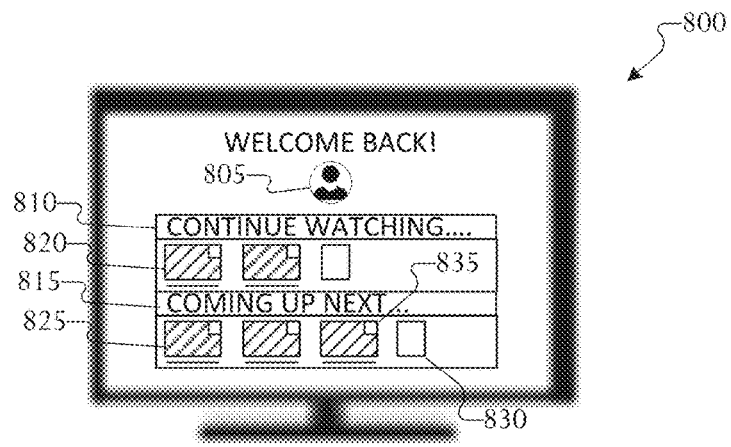
FIG. 8 illustrates an exemplary user-aware interface according to embodiments of the present disclosure.

FIG. 8 illustrates an exemplary user-aware interface 800 according to embodiments of the present disclosure. The embodiment of the user-aware interface 800 shown in FIG. 8 is for illustration only. Other embodiments of user-aware interfaces could be used without departing from the scope of this disclosure.

The user-aware interface 800 is customized for the user(s) that is recognized using the user-aware remote. The user-aware interface 800 includes a user icon 805, a continue watching list 810 and a coming up next list 815.

The continue watching list 810 displays previously watched content 820 and a more icon 830. The previously watched content 820 is content that a viewer began consuming, but did not complete or finish the content. The previously watched content 820 can include an indicator for the amount of the content that has been consumed.

Selecting the previously watched content provides the user the option to start from the beginning or resume. The coming up next list 815 includes subsequent content 825 and a more icon 830. The subsequent content 825 includes content that may have just started or is starting soon. The subsequent content 825 can include an indicator for the amount of time before the content will begin or amount of time that the content has been presented.

The previously watched content 820 and the subsequent content 825 can include an app icon 835. The app icon 835 indicates that the application corresponding to the content is currently available.

Figure 9A:
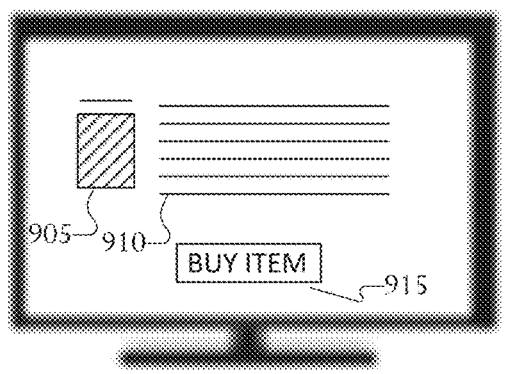
FIGS. 9A, 9B and 9C illustrate exemplary security interfaces for purchasing items securely according to embodiments of the present disclosure.
Figure 9B:
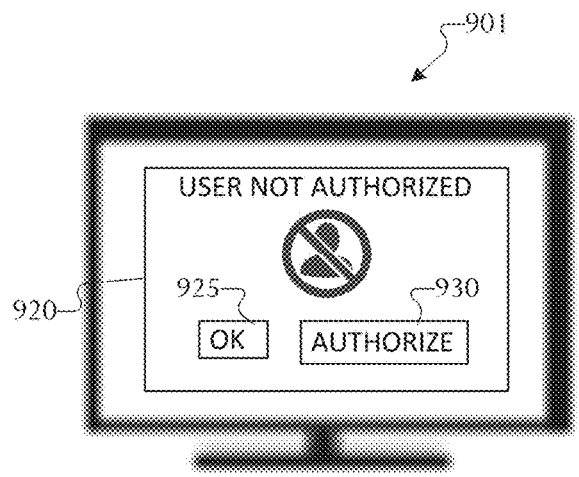
Figure 9C:
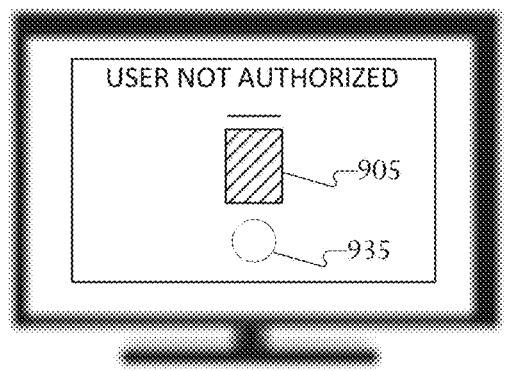

FIGS. 9A, 9B and 9C illustrate exemplary security interfaces 900, 901, 902 for purchasing items securely according to embodiments of the present disclosure. The embodiment of the exemplary security interfaces 900, 901, 902 shown in FIGS. 9A-9C are for illustration only. Other embodiments of security interfaces could be used without departing from the scope of this disclosure.

Security interfaces 900, 901, 902 display different security features related to purchasing an item on the interface. Security interface 900 includes a purchasable item 905, an item description 910 and a purchase link 915. The purchasable item 905 is an item for sale on the interface 900 that includes an image of the item and a name of the item. The item description 910 provides a description of the purchasable item 905 including dimensions and features. The purchase link 915 is a selectable button to begin the process of purchasing the purchasable item 905.

Security interface 901 is displayed when the user is currently not authorized to make purchases through the interface. The security interface 901 includes an unauthorized window 920 for alerting the user to the unauthorized status. The unauthorized window includes an accept link 925 and an authorize link 930. The accept link 925 cancels the transaction and returns the user to the previous interface 900. The authorize link 930 allows the user to proceed by authorizing the transaction.

Security interface 902 is displayed when the user is currently authorized, previously in-session authorized, or attempting authorization through user interface 901. The security interface 902 displays the purchasable item 905 along with an extra security icon 935. The extra security icon 935 indicates a secondary authorization, such as a fingerprint, may be required for purchase of an item. The extra security icon 935 provides a second layer of security that is different from accessing free or included content.

Figure 10A:
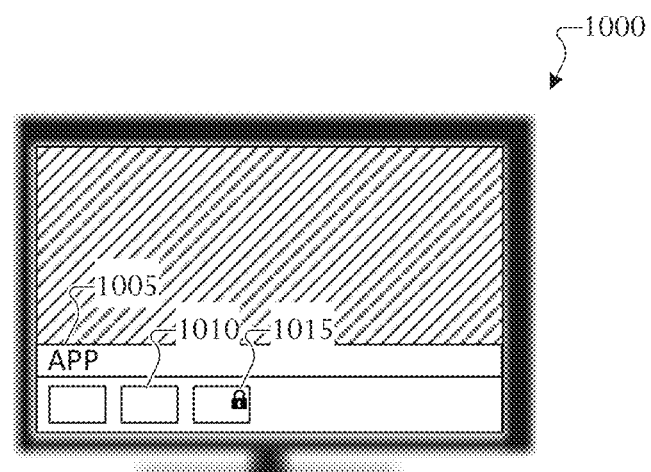
FIGS. 10A, 10B and 10C illustrate exemplary security interfaces for accessing application items according to embodiments of the present disclosure.
Figure 10B:
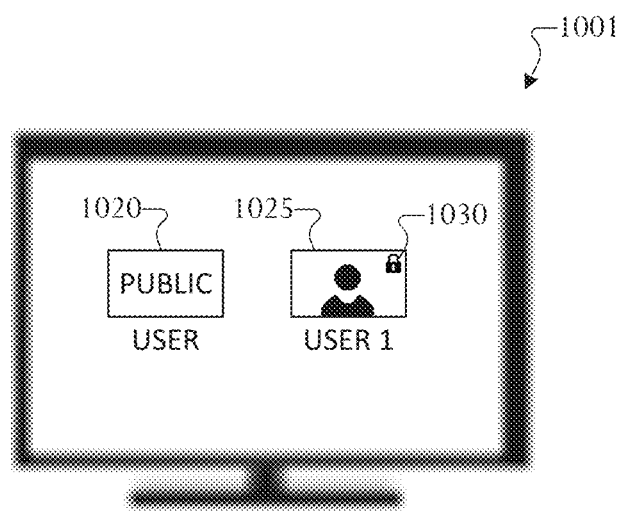
Figure 10C:
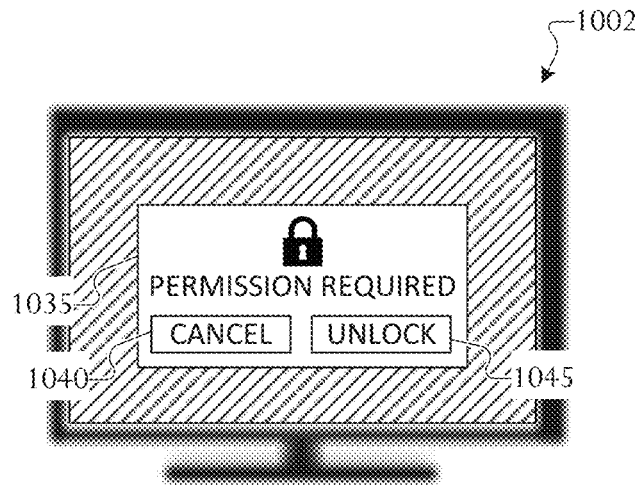

FIGS. 10A, 10B and 10C illustrate exemplary application interfaces 1000, 1001, 1002 feature for accessing application items 1010 according to embodiments of the present disclosure. The embodiment of the application interfaces 1000, 1001, 1002 shown in FIGS. 10A-10C are for illustration only. Other embodiments of application interfaces could be used without departing from the scope of this disclosure.

Application interfaces 1000, 1001, 1002 display different application features related to application usage on the interface. Application interface 1000 includes an app list 1005. The app list 1005 includes a plurality of application icons 1001 compatible with the interface. The application icons can include an app locked icon 1015. The app locked icon 1015 indicates that the specific application is locked for the user or profile that is active.

Application interface 1001 is displayed when an application is available to use with a personal account 1025 that is locked, indicated by the account lock icon 1030. The application interface 1001 provides an option to access the application icon 1010 from a public account 1020 or guest account.

Application interface 1002 is displayed when the application icon 1010 has an app locked icon 115. The application interface 1002 includes a permission window 1035 with a cancel icon 1040 and an unlock icon 1045. The cancel icon 1040 can cancel the attempt to access the application and return the interface to the previous interface. The unlock icon 1045 can proceed with an authorization of the user or unlocking of the application.

Figure 11A:
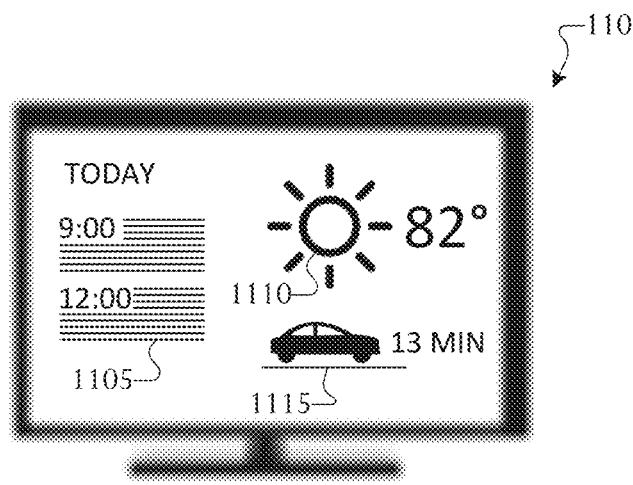
FIGS. 11A, 11B and 11C illustrate context-aware interfaces according to embodiments of the present disclosure.
Figure 11B:
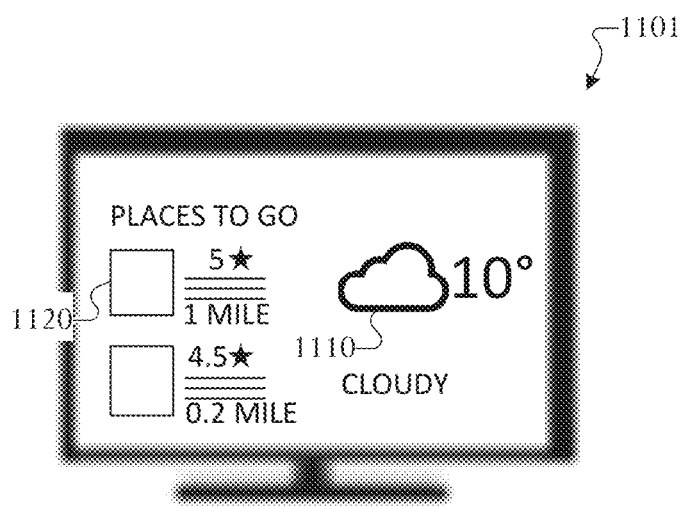
Figure 11C:
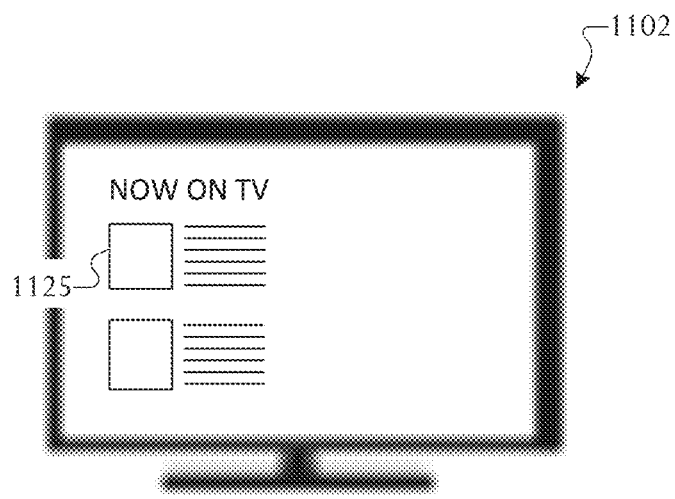

FIGS. 11A, 11B and 11C illustrate context-aware interfaces 1100, 1101, 1102 according to embodiments of the present disclosure. The embodiment of the context-aware interfaces 1100, 1101, 1102 shown in FIGS. 11A-11C are for illustration only. Other embodiments of context-aware interfaces could be used without departing from the scope of this disclosure.

Context-aware interfaces 1100, 1101, 1102 can provide content based on information aggregated from multiple sources. The multiple sources can include user profiles, network information, other devices, etc. The information that is aggregated can be based on time and day, user preferences, etc. The displayed information can disappear with no interaction from a user or, in other terms, automatically updated based on the aggregated information.

The context-aware interface 1100 could be an interface for the morning. The content that is displayed on interface 1100 for the morning could include content that is related to the morning activities, such as a morning commute. The interface 1100 could include a schedule 1105, a weather indication 1110, a traffic indication 1115, etc.

The context-aware interface 1101 could be an interface for nighttime. The content that is displayed on interface 1101 for the nighttime could include content that is related to night activities, such as dinner. The interface 1101 could include local restaurants 1120, the weather icon 1110, etc.

The context-aware interface 1102 could be an interface for quick access. The content that is displayed on interface 1102 for the quick access could include content that is related to available shows. The interface 1102 could include active content 1125, etc.

Figure 12:
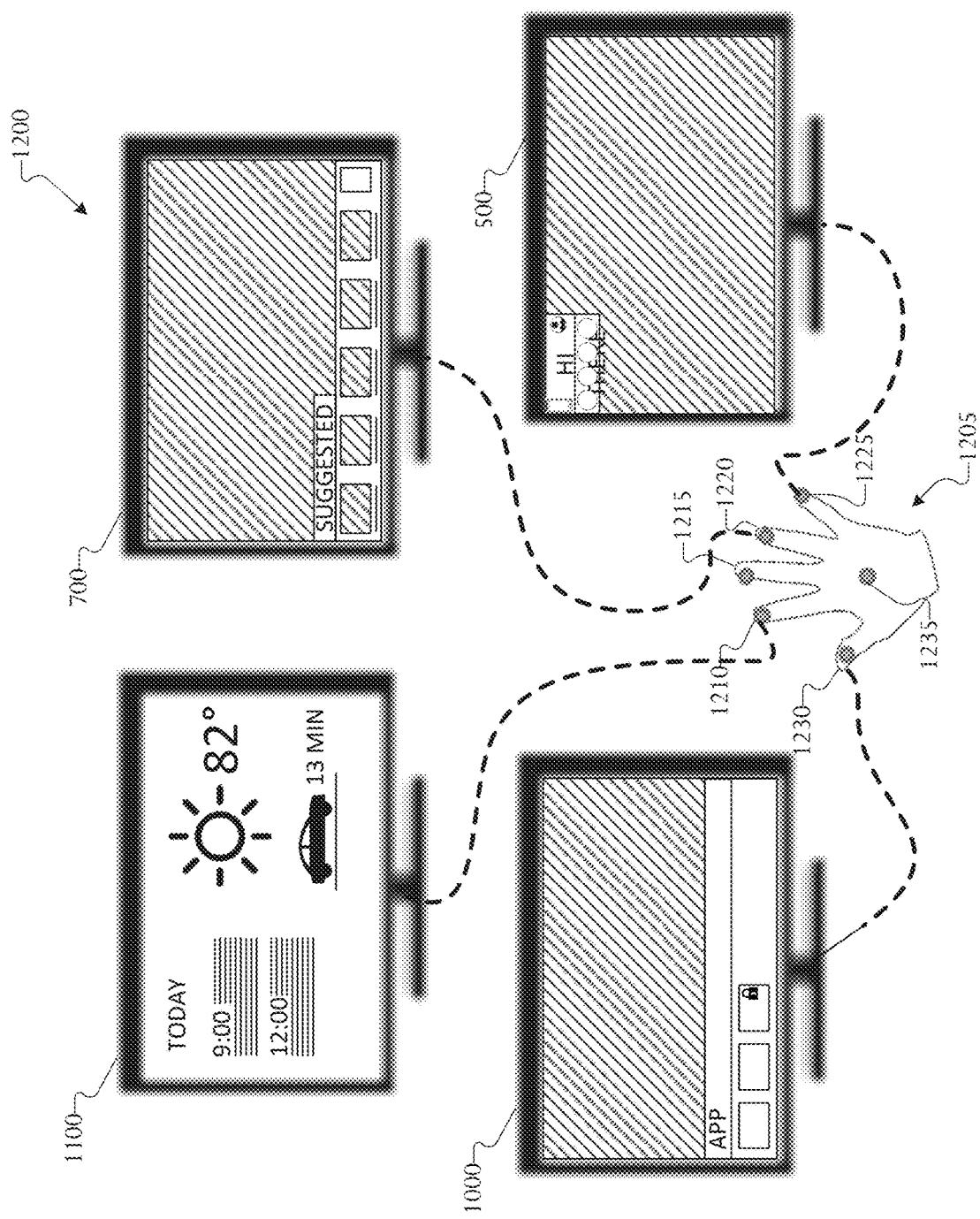
FIG. 12 illustrates a multi-detection functionality for a user-aware control by a user according to embodiments of the present disclosure.

FIG. 12 illustrates a multi-detection functionality 1200 for a user-aware control by a user 1205 according to embodiments of the present disclosure. The embodiment of the multi-detection functionality 1200 shown in FIG. 12 is for illustration only. Other embodiments of multi-detection functionality could be used without departing from the scope of this disclosure.

The multi-detection functionality 1200 for use with a user-aware remote control can provide different functions based on the detected finger the user is inputting. The user-aware remote control could identify a digit or palm of a user hand 1205, for example, a first finger 1210, a second finger 1215, a third finger 1220, a fourth finger 1225, a fifth finger 1230 (also known as a thumb), and a palm 1235. In some embodiments, each of the fingers and palm can provide unique functionality for quicker accessing of different applications, content or specific interfaces. The illustrated example multi-detection functionality provides that detecting the first finger 1210 displays the context-aware interface 1100, the second finger 1215 is not linked to any interface, the third finger displays the suggestion interface 700, the fourth finger 1220 displays the notification interface 500, the fifth finger 1230 displays the application interface 1000, and the palm 1235 is not linked.

One of the fingers or palm could be used to identify the user initially and, after the user is determined, have an assigned functionality or be null. For example, the second finger 1215 could be used to connect to a television or device and afterwards be used to return to a home screen or null activity. In certain embodiments, the second finger 1215 could have additional functionality or initial functionality.

In certain embodiments, the fingers all can provide authorization and functionality in a single press. The detected finger can provide authorization and perform a function that is mapped to the specific finger.

A combination of the fingers and palm could be also be used for specific functionality. In certain embodiments, a pattern of fingers detected would provide for different functionality than a single finger detection. When the user sensor is capable of detecting multiple fingerprints simultaneously, the multiple fingerprints would also provide a different function that the same combination of fingerprints detected in sequence.

In some embodiments. an impedance sensor can be used to detect the different portions inputted from a user. Each user has different bone/tissue/fat configurations in the hands. The different configurations can be detected by applying and reading signals of the hand (i.e. different frequencies, crosspoint, etc.). Training by the remote control can be performed, along with periodical model adjustment, to track any changes in the user's body and update the model. The impedance sensor can be used to detect multiple points in a hand for example to determine the input.

Figure 13:
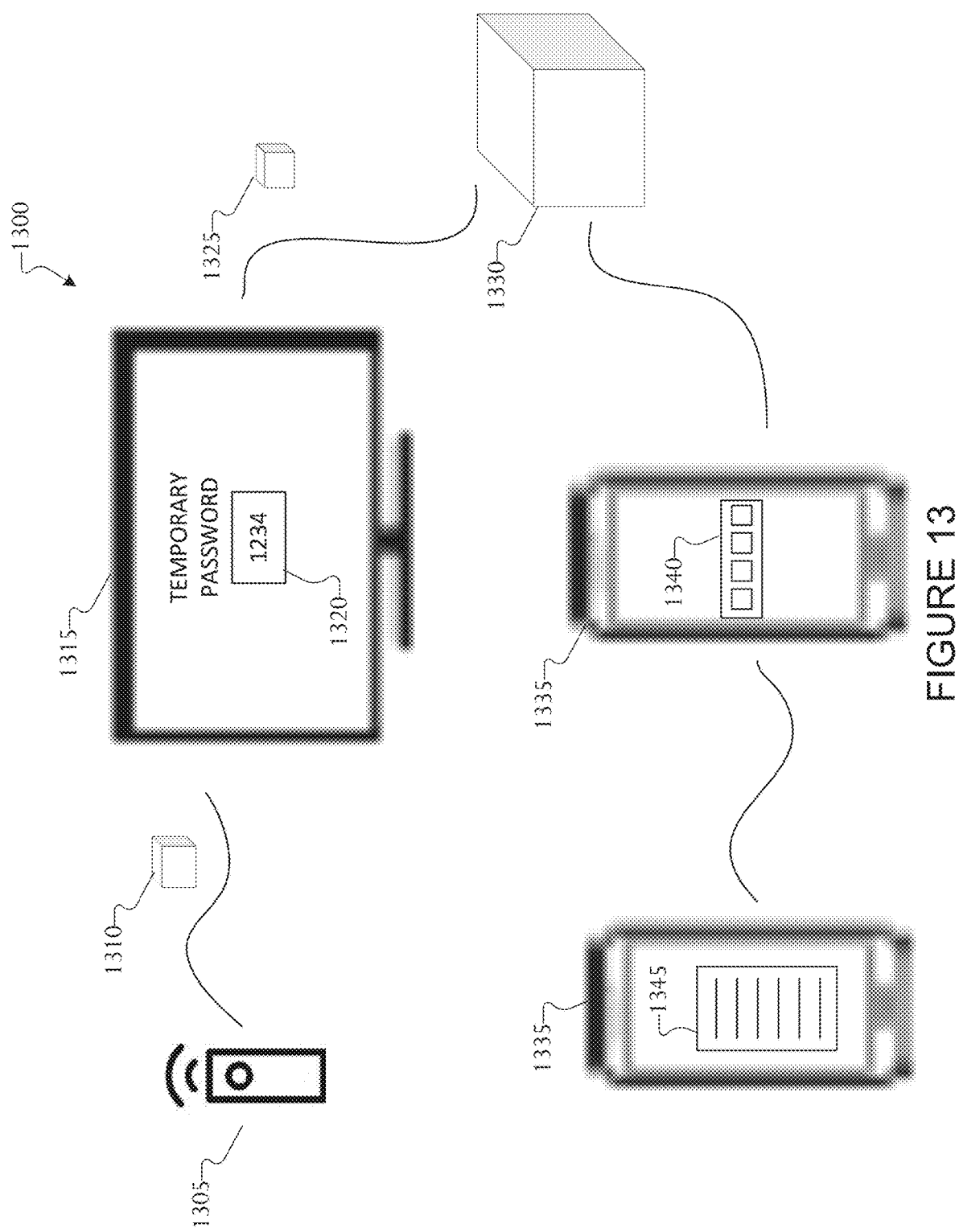
FIG. 13 illustrates an exemplary setup process according to the embodiments of the present disclosure.

FIG. 13 illustrates an exemplary setup process 1300 according to the embodiments of the present disclosure. While the process depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a user-aware remote control or user-aware interface.

The remote control 1305 detects a user input and transmits a token 1210 to the television or device 1315. The device 1315 displays a temporary password 1320 or code. The device 1315 transmits the temporary password 1320 or code in a package 1325 to a server 1330. The server 1330 prompts a mobile device 1335 (e.g., smartphone, tablet, phablet, laptop, etc.) to display a password request 1340 for input by the user. When the information in the password request 1340 matches the temporary password 1320 displayed on the device 1315, the mobile device 1335 allows access to content 1345.

Figure 14:
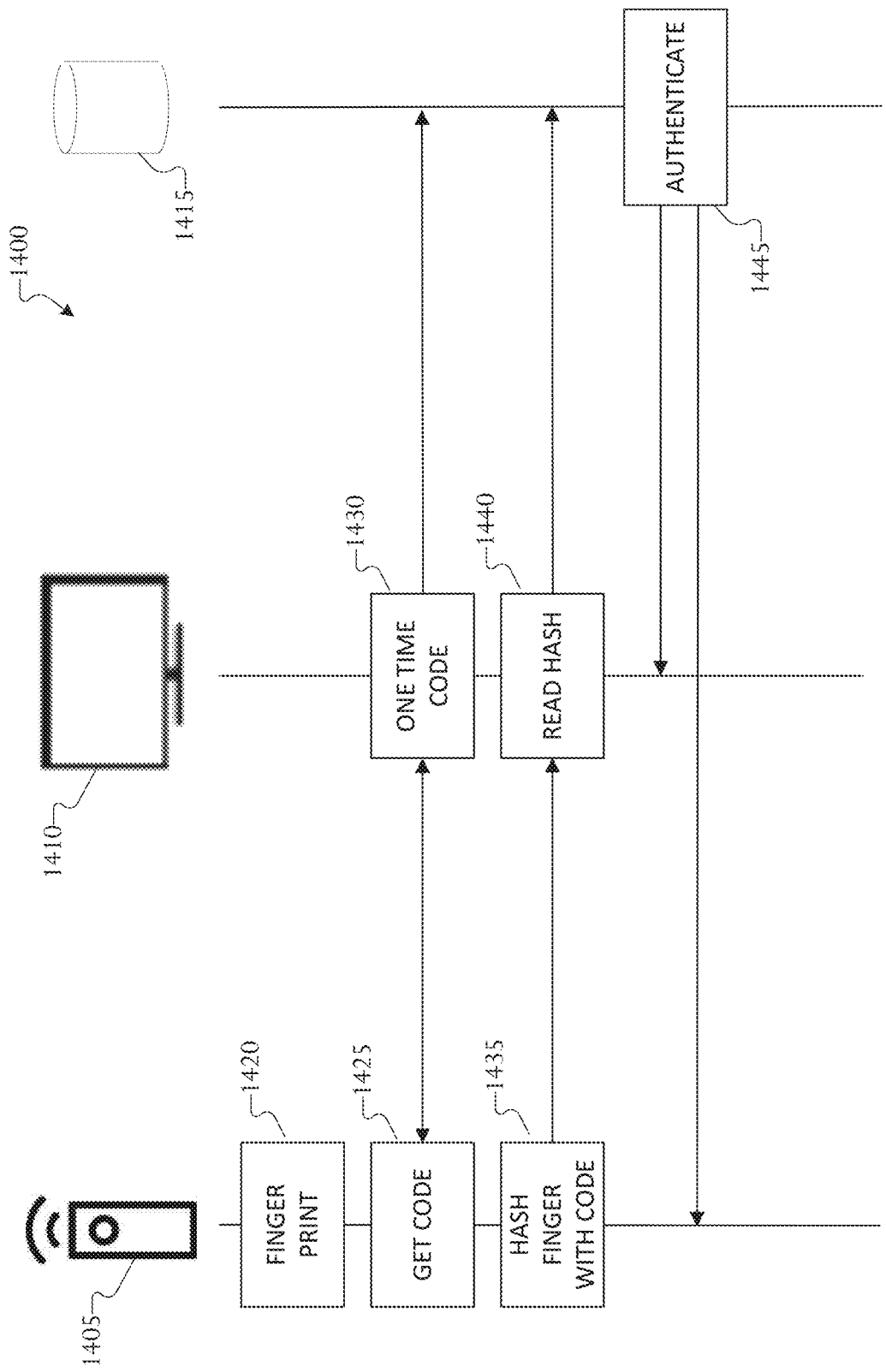
FIG. 14 illustrates an exemplary secured authentication on user-aware remote control according to the embodiments of the present disclosure.

FIG. 14 illustrates an exemplary secured authentication 1400 on user-aware remote control according to the embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a user-aware remote control or user-aware interface.

The secured authentication 1400 involves a user-aware remote control 1405, a display device 1410, and a database

1415. The database 1415 can be included in the display device 1410 or in a separate server.

In operation 1420, the remote control 1405 receives a fingerprint from a user. The fingerprint can be detected by the user sensor in the remote control 1405.

In operations 1425, the remote control 1405 communicates with the display device 1410 to generate or receive a code from the display device 1410. The code is a one-time code that is related to the user.

In operation 1430, the display device 1410 communicates with the remote control 1405 to generate or receive a code from the remote control 1405. The display device further provides the code to the database 1415.

In operation 1435, the remote control 1405 generates a hash code for the fingerprint. The hash code hides the actual fingerprint from the other devices to increase the privacy of the user and prevent others from gaining access to the fingerprint.

In operation 1440, the display device 1410 reads the hash and provides the hash to the database 1415.

In operation 1445, the database performs authorization for the user based on the one time code and the hash for the fingerprint. When the user is authorized, the database 1415 provides an indication to both the remote control 1405 and the display device 1410 of the user authorization.

Figure 15:
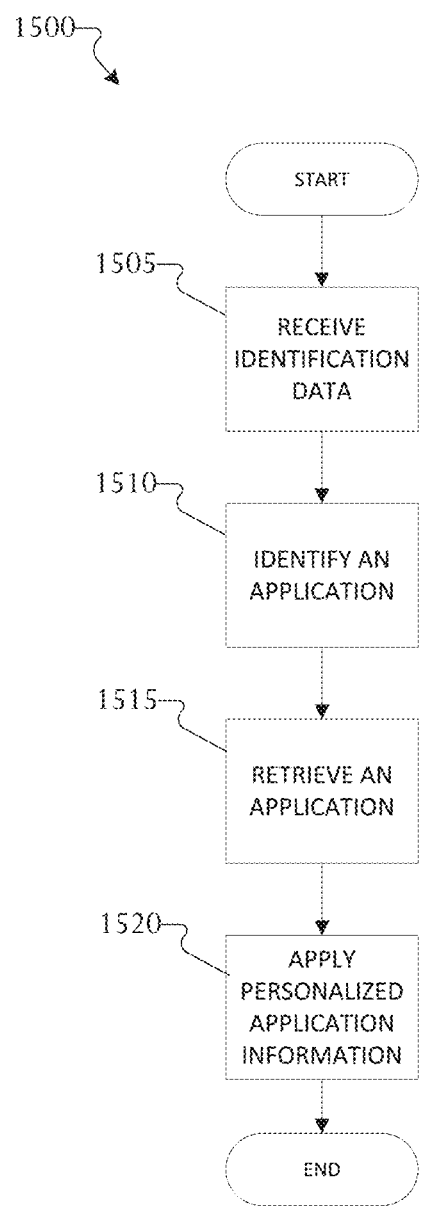
FIG. 15 illustrates a process for a user-aware remote control according to embodiments of the present disclosure.

FIG. 15 illustrates a process for a user-aware remote control according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a user-aware remote control or user-aware interface.

In operation 1505, the computing device 101 receives, from a remote control, identification data for a user of the computing device. The identification data for the user is generated at the remote control is based on biometric information associated with the user. The biometric information is received or detected by the remote control. The biometric information associated with the user is stored (at least temporarily) and utilized only (e.g., locally) at the remote control. For example, the biometric information includes at least one of a finger geometry, a hand geometry, a bone configuration, a tissue configuration, a fat configuration, a vocal representation, a facial representation, a retina representation, an iris representation, or a heart rate representation. For example, the computing device includes at least one of a smart TV, a smart media player, or a smart home appliance. Additionally, the biometric information is not provided to any servers, the cloud, or other devices. The identification data can be secured based on applying a hash function with a hash key.

The computing device 101 also receives, from the remote control, second identification data for a second user of the computing device. The second identification data for the second user is generated at the remote control based on second biometric information associated with the user. The second biometric information is received or detected by the remote control.

In operation 1510, the computing device 101 identifies, based on the identification data, at least one application associated with the user and operable at the computing device. The computing device 101 also identifies, based on the second identification data, that the at least one application is associated with the second user. The computing device 101 also identifies, based on the identification data, at least one setting associated with the user and applicable to the computing device. In certain embodiments, the at least one application is identified based on having an account associated with the user.

In operation 1515, the computing device 101 retrieves, based on the identification data, personalized application information associated with the user and applicable to the at least one application. The personalized application information and the preference data associated with the user is stored remote from the remote control. The computing device 101 also retrieves, based on the second identification data, second personalized application information associated with the second user and applicable to the at least one application. The computing device 101 also retrieves, based on the identification data, preference data associated with the user and applicable to the at least one setting.

In certain embodiments, the personalized application information and the preference data associated with the user is stored at one or more cloud servers remote from the remote control. The personalized application information and the preference data associated with the user are accessible from the one or more cloud servers, based on the identification data, by the computing device and by at least one other computing device.

In certain embodiments, the personalized application information associated with the user includes a previous state at which the user was utilizing the at least one application. The at least one application includes a multimedia streaming application. The previous state includes a view progress of the user within the multimedia streaming application.

In operation 1520, the computing device 101 applies the personalized application information to the at least one application at the computing device. The computing device 101 also applies the second personalized application information to the at least one application operable at the computing device. In certain embodiments, the personalized application information associated with the user and the second personalized application information associated with the second user are applied to the at least one application for at least a partially overlapping time duration. The computing device 101 also applies the preference data to the at least one setting.

When the at least one application is identified based on having an account associated with the user, applying the personalized application information to the at least one application operable at the computing device includes executing the at least one application at the computing device and logging the user into the account at the at least one application.

Although various features have been shown in the figures and described above, various changes may be made to the figures. For example, the size, shape, arrangement, and layout of components shown in FIGS. 1 through 15, are for illustration only. Each component could have any suitable size, shape, and dimensions, and multiple components could have any suitable arrangement and layout. Also, various components in FIGS. 1 through 15 could be combined, further subdivided, or omitted and additional components could be added according to particular needs. Further, each component in a device or system could be implemented using any suitable structure(s) for performing the described function(s). In addition, whiles FIG. 15 illustrates various series of steps, various steps in FIG. 15 could overlap, occur in parallel, occur multiple times, or occur in a different order.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method comprising:
   receiving, by a computing device operable with a remote control, identification data for a user of the computing device, the identification data for the user being generated at the remote control based on biometric information associated with the user received at the remote control;
   receiving, from the remote control, second identification data for a second user of the computing device, the second identification data for the second user being generated at the remote control based on biometric information associated with the second user received at the remote control;
   identifying, by the computing device, based on both the received identification data and the received second identification data, at least one application associated with both the user and the second user and operable at the computing device;
   retrieving, by the computing device, based on the received identification data and the received second identification data, personalized application information associated with the user and second personalized application information associated with the second user and applicable to the at least one application, wherein the personalized application information and the second personalized application information are different; and
   applying, by the computing device, the personalized application information and the second personalized application information to the at least one application operable at the computing device, wherein applying the personalized application information and the second personalized application information to the at least one application includes logging the user into an account at the at least one application and logging the second user into a second account at the at least one application.

2. The method of claim 1, further comprising:
   identifying, by the computing device, based on the biometric information associated with the user, the at least one application from a plurality of applications associated with different biometrics of the user;
   retrieving, by the computing device, based on the biometric information associated with the user, biometric personalized application information associated with the user and applicable to the at least one application; and
   applying, by the computing device, the biometric personalized application information to the at least one application operable at the computing device.

3. The method of claim 1, wherein the personalized application information associated with the user and the second personalized application information associated with the second user are applied to the at least one application for at least a partially overlapping time duration.

4. The method of claim 1, further comprising:
   identifying, based on the identification data, at least one setting associated with the user and applicable to the computing device;
   retrieving, based on the identification data, preference data associated with the user and applicable to the at least one setting; and
   applying the preference data to the at least one setting.

5. The method of claim 4, wherein:
   the personalized application information and the preference data associated with the user are stored remote from the remote control, and
   the biometric information associated with the user is utilized locally at the remote control.

6. The method of claim 5, wherein:
   the personalized application information and the preference data associated with the user are stored at one or more cloud servers remote from the remote control, and
   the personalized application information and the preference data associated with the user are accessible from the one or more cloud servers, based on the identification data, by the computing device and by at least one other computing device.

7. The method of claim 1, wherein the personalized application information associated with the user includes a previous state at which the user was utilizing the at least one application.

8. The method of claim 7, wherein:
   the at least one application includes a multimedia streaming application, and
   the previous state includes a view progress of the user within the multimedia streaming application.

9. The method of claim 1, wherein:
   the at least one application is identified based on having an account associated with the user, and
   applying the personalized application information to the at least one application operable at the computing device includes executing the at least one application at the computing device.

10. The method of claim 1, wherein the biometric information associated with the user includes at least one of a finger geometry, a hand geometry, a bone configuration, a tissue configuration, a fat configuration, a vocal representation, a facial representation, a retina representation, an iris representation, or a heart rate representation.

11. The method of claim 1, wherein the computing device includes at least one of a mobile device, a smart TV, a smart media player, or a smart home appliance.

12. The method of claim 1, wherein the identification data is secured based on applying a hash function with a hash key.

13. A computing device comprising:
   a transceiver configured to communicate with a remote control; and
   a processor configured to:
      receive, from the remote control, identification data for a user of the computing device, the identification data for the user being generated at the remote control based on biometric information associated with the user received at the remote control;
      receive, from the remote control, second identification data for a second user of the computing device, the second identification data for the second user being generated at the remote control based on biometric information associated with the second user received at the remote control;
      identify, based on both the received identification data and the received second identification data, at least one application associated with both the user and the second user;
      retrieve, based on the received identification data and the received second identification data, personalized application information associated with the user and second personalized information associated with the second user and applicable to the at least one application, wherein the personalized application information and the second personalized application information are different; and apply the personalized application information and the second personalized information to the at least one application, wherein to apply the personalized application information and the second personalized application information to the at least one application includes logging the user into an account at the at least one application and logging the second user into a second account at the at least one application.

14. The computing device of claim 13, wherein the processor is further configured to:
identify, based on the biometric information associated with the user, the at least one application from a plurality of applications associated with different biometrics of the user;
retrieve, based on the biometric information associated with the user, biometric personalized application information associated with the user and applicable to the at least one application; and
apply the biometric personalized application information to the at least one application operable at the computing device.

15. The computing device of claim 13, wherein the personalized application information associated with the user and the second personalized application information associated with the second user are applied to the at least one application for at least a partially overlapping time duration.

16. The computing device of claim 13, wherein the processor is further configured to:
identify, based on the identification data, at least one setting associated with the user;
retrieve, based on the identification data, preference data associated with the user and applicable to the at least one setting; and
apply the preference data to the at least one setting.

17. The computing device of claim 16, wherein:
the personalized application information and the preference data associated with the user are stored remote from the remote control, and
the biometric information associated with the user is utilized locally at the remote control.

18. The computing device of claim 17, wherein:
the personalized application information and the preference data associated with the user are stored at one or more cloud servers remote from the remote control, and
the personalized application information and the preference data associated with the user are accessible from the one or more cloud servers, based on the identification data, by the computing device and by at least one other computing device.

19. The computing device of claim 13, wherein the personalized application information associated with the user includes a previous state at which the user was utilizing the at least one application.

20. A non-transitory computer readable medium comprising a plurality of instructions that, when executed by a processor, are configured to cause the processor to:
receive identification data for a user of a computing device, the identification data for the user being generated at a remote control based on biometric information associated with the user received at the remote control;
receive, from the remote control, second identification data for a second user of the computing device, the second identification data for the second user being generated at the remote control based on biometric information associated with the second user received at the remote control;
identify, based on both the received identification data and the received second identification data, at least one application associated with both the user and the second user and operable at the computing device;
retrieve, based on the received identification data and the received second identification data, personalized application information associated with the user and second personalized application information associated with the second user and applicable to the at least one application, wherein the personalized application information and the second personalized application information are different; and
apply the personalized application information and the second personalized application information to the at least one application operable at the computing device, wherein to apply the personalized application information and the second personalized application information to the at least one application includes logging the user into an account at the at least one application and logging the second user into a second account at the at least one application.

* * * * *